Patented Oct. 6, 1936

2,056,324

UNITED STATES PATENT OFFICE 2,056,324

METHOD FOR THE PRODUCTION OF ARALKYL ETHERS OF CELLULOSE

Eugene J. Lorand, Wilmington, Del., assignor to Hercules Powder Company, Wilmington, Del., a corporation of Delaware No Drawing. Application July 30, 1934,
Serial No. 737,576

12 Claims. (Cl. 260—152)

This invention relates to a method for the production of aralkyl ethers of cellulose and more particularly for the production of benzyl cellulose.

Aralkyl ethers of cellulose, such as, for example, benzyl cellulose, the phenylethyl ether of cellulose, etc., are produced by the reaction of an aralkyl halide, such as benzyl chloride, phenylethyl chloride, etc., upon an intimate mixture of cellulose and an alkali solution, commonly referred to as alkali cellulose. Many procedures for conducting the reaction are known, but substantially all involve heating the mixture of alkali cellulose and aralkyl halide, usually at a temperature of about 60°–130° C. Sometimes all the alkali to be used is added at the start of the reaction, more often only a part is added initially and the remainder is added periodically during the reaction. When the reaction is conducted at a relatively high temperature, distillation of water and aralkyl halide (the latter being returned) from the reaction mass is often permitted.

The principal reaction involved is that between the aralkyl halide and the alkali cellulose leading to the production of an aralkyl ether of cellulose and an alkali halide. However, the aralkyl halide present is hydrolyzed and otherwise affected by the alkali solution present with the resultant formation of by-products, such as, for example, when a benzyl halide is used, benzyl alcohol, dibenzyl ether, etc. The formation of such by-products is undesirable, since the side reactions leading to their production involve the wasteful use of both alkali and aralkyl halides. Since the aralkylation reaction is ordinarily carried out in the presence of a large excess of aralkyl halide, the amount of such by-products is rather large in comparison with the amount of cellulose ether formed.

When the reaction is completed, there accordingly remains, after the separation and removal of the cellulose ether, a mixture of excess aralkyl halide together with the various aralkyl alcohols and ethers formed by the side reactions. While the aralkyl halide may be recovered from this mixture and utilized again in the preparation of the cellulose ether, the by-products must either be disposed of as such or else converted into aralkyl halide for reuse in the reaction. It is not possible to dispose of these by-products economically as such, and their conversion back to the form of aralkyl halide is also expensive and uneconomical.

It is the purpose of this invention to provide a method for the formation of aralkyl ethers of cellulose which eliminates, to a large degree, the undesirable side reactions and the consequent production of uneconomical by-products. The by-products which are least desirable, both because of the difficulty in disposing of them as such and the difficulty in converting them into aralkyl halide, are the aralkyl ethers such as, for example, dibenzyl ether.

It has been found, in accordance with this invention, that the excessive hydrolysis of the aralkyl halide which usually occurs in the aralkylation of cellulose is caused to a large degree by the vigorous agitation customarily imparted to the reaction mass. This agitation, by intimately mixing the immiscible aralkyl halide and aqueous alkali solution, produces a large contact area between these two substances and hence greatly increases the hydrolysis reaction. Elimination of agitation would, however, in no wise solve the problem presented, since without agitation the aralkylation reaction cannot be made to proceed to completion.

It has been found, however, in accordance with this invention, that the aralkylation reaction comprises two stages. In the first stage of the reaction the cellulose is uniformly impregnated with alkali and, being fluffy in nature, presents a very large surface to the aralkyl halide. The aralkylation reaction will accordingly proceed readily during this stage with only very gentle agitation or even with no agitation at all. Therefore, it is most advantageous to dispense with any vigorous agitation during this stage of the reaction.

This stage of the reaction continues until substantially all the alkali present has been consumed, or until the reaction mass has formed a uniform "dope." If the reaction is carried out at a relatively high temperature and distillation of water and aralkyl halide from the reaction mass is permitted, as is usual in reaction at the higher temperatures, the completion of the first stage of the reaction will be shown by the formation of a uniform dope. If the reaction is carried out at lower temperatures without distillation, the completion of the first stage will be shown by a determination of the amount of alkali present in the reaction mass. Such determinations may be made periodically if desired during the first stage of the reaction.

The duration of this first stage of reaction will be, depending upon the amount of alkali initially present, the temperature of the reaction, whether or not distillation is permitted, etc., from one-half hour to several days.

When the first stage of the aralkylation reaction is completed, it may be necessary to add more alkali to the reaction mass. The amount of alkali to be added depends upon the amount initially present and upon the temperature at which the reaction was conducted. The addition of alkali during the aralkylation reaction has been usual in all processes for the production of aralkyl ethers of cellulose except those few in which the total amount of alkali required for complete reaction is added at the start. It is accordingly well known how to determine the amounts of alkali to be added in the second stage of the reaction.

In order to bring this additional alkali into intimate contact with the remaining fibers throughout the reaction mass and so make it completely effective, vigorous agitation is advisable. However, even at this stage mechanical stirring may be avoided in cases where boiling of the mixture provides efficient agitation. The second stage of the reaction continues until the reaction is complete, as evidenced by a complete dispersion of the cellulose fibres. This will take, depending upon the conditions prevailing in the first stage, the temperature and exact method of treatment in the second stage, etc., from one-half hour to five hours.

The aralkyl ether of cellulose formed may then be separated from the reaction mass by any of the usual methods. The amount of alkali consumed during the reaction, which is a direct measure of the hydrolysis of aralkyl halide occurring, will be found to be only about 50-85% of the amount consumed during the usual reaction throughout which vigorous agitation is employed.

The reaction in accordance with this invention may be carried out in any suitable apparatus. For the first stage of the reaction, apparatus capable of imparting gentle agitation is desirable. A slowly-revolving drum or barrel, with or without interior baffles is, for example, suitable. If the reaction is carried out at relatively high temperatures, suitable condensers may be connected to the revolving drum through a hollow shaft. Desirably the drum or barrel will be rotated only intermittently. A Werner and Pfleiderer mixer may also be used and the first stage of the reaction conducted in such a device by operating it intermittently at a very low speed.

The same apparatus that is used for the first stage of the reaction may also be used for the second stage if this is carried out at a relatively high temperature with distillation; or the apparatus may be equipped with devices, such as stirrers, etc., for imparting the vigorous agitation to the reaction mass which is necessary if the second stage is carried out at a relatively low temperature, i. e. without distillation. Otherwise, the reaction mixture will be transferred to a separate mixer equipped for vigorous agitation for the second stage of the reaction.

The following example is illustrative of procedure in accordance with this invention:

*Example 1*

2 pounds of purified cotton linters are steeped in 40 pounds of 33% caustic soda solution and, after one to two hours, pressed to a weight of 8-8½ lbs. The alkali cellulose thus obtained is first shredded in some suitable device, and is then placed in a drum adapted to revolve about its inclined axis. 24 lbs. of benzyl chloride are introduced and the mass is heated to about 120-125° C., so that distillation takes place. The heating may be effected by an oil bath in which the slowly revolving drum is partially submerged. The vapors, consisting of an azeotropic mixture of water and benzyl chloride, escape through the hollow shaft which leads into a condenser having an opening wide enough to permit free motion of the shaft and free space for the flow of the condensate. The condensate is removed through a hole, a vertical side-tube or a spout at the lower end of the condenser. The revolving drum may have in its lower half two baffles placed opposite each other to facilitate the gentle agitation of the reaction mass. In about 1-1½ hours, more than half of the water will have distilled over, and a viscous, semi-liquid to liquid mass is obtained. This mass is then transferred to suitable apparatus fitted with an efficient stirring device, and distillation is continued with vigorous agitation. In about 1-1½ hours, the remainder of the water will have distilled over and distillation stops. A sample of the dope is inspected and, if undispersed fibres are found, 1-2 lbs. 33% caustic soda solution, and, if the dope is too viscous, 1-2 lbs. benzyl chloride are added and distillation is resumed until complete dispersion occurs.

When the benzylation is finished, the product is separated by any of the known methods, such as precipitation with a non-solvent. The precipitate is then washed several times with the non-solvent, subsequently with water, and, finally, extracted with methanol.

The direct hydrolysis of the benzyl chloride may be estimated on the basis of the alkali consumption. In the above example, about 2¼-2¾ lbs. of sodium hydroxide are consumed, depending on the quality of raw material, details of apparatus, etc. If the benzylation were carried out according to prior methods, the alkali consumption would be at least 3½-5½ lbs.

*Example 2*

Alkali cellulose is prepared from 2 pounds of purified linters in the same way as in Example 1, and is treated with 18 pounds of benzyl chloride in the same revolving drum at 90° C. for 15 hours. Then 6 pounds more benzyl chloride are added to the reaction mass retained in the same apparatus, and the temperature is raised to 120-125° C., so that distillation takes place. The water and benzyl chloride vapors are condensed and the condensate is removed by the same arrangement used in Example 1. As the apparatus is not equipped with special stirring devices, this second stage of the reaction is carried out with the same gentle agitation as the first. In about 1½-2½ hours, all the water will have distilled over and distillation stops. A sample of the dope is inspected and, if undispersed fibers are found, 1-2 pounds 33% caustic soda solution and, if the dope is too viscous, 2-3 pounds benzyl chloride, are added and distillation is resumed until complete dispersion occurs. When the benzylation is finished, the product is separated and purified, as in Example 1. The amount of sodium hydroxide consumed in this example is 2-2½ pounds, as compared with a caustic consumption of 3½-5 pounds when the benzylation is carried out according to prior methods.

It will be understood that the method in accordance with this invention is applicable to any of the usual and well known processes for the production of aralkyl ethers of cellulose, and that essentially it comprises conducting the first stage of the aralkylation reaction, during which the cellulose retains in absorbed form a relatively large quantity of alkali, without agitation of the reaction mass, or with only very gentle agitation thereof, and, preferably, the second stage without mechanical agitation of the reaction mass. It will further be understood that the method in accordance with this invention is in no way limited to the details of procedure set forth hereinabove by way of illustration only.

Having now fully described my invention, what I claim and desire to protect by Letters Patent is:

1. The method for the production or aralkyl ethers of cellulose which includes reacting alkali cellulose and an aralkyl halide while maintaining the reaction mass in a sufficiently quiescent condition during that period of the reaction in which the cellulosic fibres present retain absorbed therein any substantial quantity of alkali to substantially minimize hydrolysis of the aralkyl halide present.

2. The method for the production or aralkyl ethers of cellulose which includes heating together to reaction temperature alkali cellulose and an aralkyl halide while maintaining the reaction mass in a sufficiently quiescent condition to substantially minimize hydrolysis of the aralykyl halide present until the reaction mass attains a substantially uniform consistency and then imparting vigorous agitation to the reaction mass during the remainder of the reaction.

3. The method for the production of aralkyl ethers of cellulose which includes heating together to reaction temperature alkali cellulose and an aralkyl halide while maintaining the reaction mass in a sufficiently quiescent condition to substantially minimize hydrolysis of the aralkyl halide present until the reaction mass attains a substantially uniform consistency, adding alkali to the reaction mass, and imparting vigorous agitation thereto during the remainder of the reaction.

4. The method for the production of aralkyl ethers of cellulose which includes heating together to reaction temperature alkali cellulose and an aralkyl halide while maintaining the reaction mass in a sufficiently quiescent condition to substantially minimize hydrolysis of the aralkyl halide present until substantially all the alkali initially present has been consumed, adding additional alkali to the reaction mass, and imparting vigorous agitation thereto during the remainder of the reaction.

5. The method for the production of benyzl cellulose which includes reacting alkali cellulose and benzyl chloride while maintaining the reaction mass in a sufficiently quiescent condition during that period of the reaction in which the cellulosic fibres present retain absorbed therein any substantial quantity of alkali to substantially minimize hydrolysis of the benzyl chloride present.

6. The method for the production of benzyl cellulose which includes heating together to reaction temperature alkali cellulose and benzyl chloride while maintaining the reaction mass in a sufficiently quiescent condition to substantially minimize hydrolysis of the benzyl chloride present until the reaction mass attains a substantially uniform consistency and then imparting vigorous agitation to the reaction mass during the remainder of the reaction.

7. The method for the production of benzyl cellulose which includes heating together to reaction temperature alkali cellulose and benzyl chloride while maintaining the reaction mass in a sufficiently quiescent condition to substantially minimize hydrolysis of the benzyl chloride present until the reaction mass attains a substantially uniform consistency, adding alkali to the reaction mass, and imparting vigorous agitation thereto during the remainder of the reaction.

8. The method for the production of benzyl cellulose which includes heating together to reaction temperature alkali cellulose and benzyl chloride while maintaining the reaction mass in a sufficiently quiescent condition to substantially minimize hydrolysis of the benzyl chloride present until substantially all the alkali initially present has been consumed, adding additional alkali to the reaction mass and imparting vigorous agitation thereto during the remainder of the reaction.

9. The method for the production of aralkyl ethers of cellulose which includes heating together to reaction temperature but below distillation temperature alkali cellulose and an aralkyl halide while maintaining the reaction mass in a sufficiently quiescent condition to substantially minimize hydrolysis of the aralkyl halide present until the reaction mass attains a substantially uniform consistency and then effecting agitation of the reaction mass by conducting the remainder of the reaction at a temperature at which distillation occurs.

10. The method for the production of benzyl cellulose which includes heating together to reaction temperature but below distillation temperature alkali cellulose and benzyl chloride while maintaining the reaction mass in a sufficiently quiescent condition to substantially minimize hydrolysis of the benzyl chloride present until the reaction mass attains a substantially uniform consistency and then effecting agitation of the reaction mass by conducting the remainder of the reaction at a temperature at which distillation occurs.

11. The method for the production of aralkyl ethers of cellulose which includes heating together alkali cellulose and an aralkyl halide to a temperature sufficient to cause distillation of the aralkyl halide from the reaction mass, while maintaining the reaction mass in a sufficiently quiescent condition to substantially minimize hydrolysis of the aralkyl halide present until the reaction mass attains a substantially uniform consistency, adding alkali to the reaction mass and imparting vigorous agitation thereto during the remainder of the reaction.

12. The method for the production of benzyl cellulose which includes heating together alkali cellulose and benzyl chloride to a temperature sufficient to cause distillation of benzyl chloride from the reaction mass, while maintaining the reaction mass in a sufficiently quiescent condition to substantially minimize hydrolysis of the benzyl chloride present until the reaction mass attains a substantially uniform consistency, adding alkali to the reaction mass and imparting vigorous agitation thereto during the remainder of the reaction.

EUGENE J. LORAND.